US008989010B2

(12) United States Patent  
Beheshti-Zavareh et al.

(10) Patent No.: US 8,989,010 B2  
(45) Date of Patent: Mar. 24, 2015

(54) DELAYED BASED TRAFFIC RATE CONTROL IN NETWORKS WITH CENTRAL CONTROLLERS

(71) Applicants: Neda Beheshti-Zavareh, San Jose, CA (US); Joel Halpern, Leesburg, VA (US)

(72) Inventors: Neda Beheshti-Zavareh, San Jose, CA (US); Joel Halpern, Leesburg, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 244 days.

(21) Appl. No.: 13/678,396

(22) Filed: Nov. 15, 2012

(65) Prior Publication Data

US 2014/0016474 A1    Jan. 16, 2014

Related U.S. Application Data

(60) Provisional application No. 61/669,943, filed on Jul. 10, 2012.

(51) Int. Cl.
```
H04L 12/26      (2006.01)
H04L 12/841     (2013.01)
H04L 12/815     (2013.01)
```
(52) U.S. Cl.
CPC .............. *H04L 47/283* (2013.01); *H04L 47/22* (2013.01); *H04L 43/0852* (2013.01)
USPC ........................................................ 370/236

(58) Field of Classification Search
USPC ........................................ 370/236, 229, 231
See application file for complete search history.

(56) References Cited

U.S. PATENT DOCUMENTS 6,459,682 B1 * 10/2002 Ellesson et al. ............... 370/235  
2005/0169190 A1 * 8/2005 Mathieu et al. ............... 370/252

OTHER PUBLICATIONS

U.S. Appl. No. 13/464,182, filed May 4, 2012, entitled "Congestion Control in Packet Data networking", 48 pages.  
McKeown, Nick , et al., ""OpenFlow: Enabling Innovation in Campus Networks"," Mar. 14, 2008, 6 pages, downloaded from http://www.openflow.org/documents/openflow-wp-latest.pdf on Sep. 26, 2011.  
Zseby, Tanja , et al., "IPIX Applicability", *IETF draft*, Apr. 2004.

* cited by examiner

*Primary Examiner* — Mohammad Anwar  
(74) *Attorney, Agent, or Firm* — Blakely, Sokoloff, Taylor & Zafman, LLP (57) ABSTRACT

A process is performed by a controller in a split-architecture network. The controller monitors congestion of traffic groups across the split-architecture network and executes the process to provide delay based data rate control to alleviate congestion of the traffic groups. The process includes configuring an ingress switch and egress switch for each traffic group to collect delay measurement data for data packets of each traffic group as they arrive at the ingress switch and egress switch. The delay measurement data is received from the ingress switch and egress switch of each traffic group. A check is made whether a minimum data packet delay for any traffic group exceeds a defined threshold value. A throttling rate is calculated for each traffic group in the split-architecture network, in response to the defined threshold value being exceeded.

14 Claims, 4 Drawing Sheets

DELAYED BASED TRAFFIC RATE CONTROL IN NETWORKS WITH CENTRAL CONTROLLERS

CROSS-REFERENCE TO RELATED APPLICATIONS

The present application claims priority from U.S. Provisional application No. 61/669,943 filed on Jul. 10, 2012.

FIELD

Embodiments of the invention relate to the field of split-architecture networks; and more specifically, to load balancing across the split-architecture network.

BACKGROUND

Unlike the traditional network architecture, which integrates both the forwarding (data) and the control planes in the same box (network element), a split-architecture network decouples these two planes and executes the control plane on servers that might be in different physical locations from the forwarding elements (switches). The use of a split-architecture in a network enables the simplification of the switches implementing the forwarding plane and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments. Despite the rapid improvement of line speeds, port densities, and performance, the network control plane mechanisms have advanced at a much slower pace than the forwarding plane mechanisms.

In a split-architecture network, controllers collect information from switches, and compute and distribute the appropriate forwarding decisions to switches. Controllers and switches use a protocol to communicate and exchange information. An example of such protocol is OpenFlow (see www.openflow.org), which provides an open and standard method for a switch to communicate with a controller, and it has drawn significant interest from both academics and industry.

SUMMARY

A process is performed by a controller in a split-architecture network. The controller is coupled to a plurality of switches implementing the data plane of the split-architecture network, wherein the controller monitors congestion of traffic groups across the split-architecture network and executes the process for providing delay based data rate control to alleviate congestion of the traffic groups across the split-architecture network, where each traffic group is a flow of data packets to be handled in a same manner, the data packets of each traffic group having a shared ingress switch and egress switch from the plurality of switches for the split-architecture network. The process includes configuring an ingress switch and egress switch for each traffic group to collect delay measurement data for data packets of each traffic group as they arrive at the ingress switch and egress switch. The delay measurement data is received from the ingress switch and egress switch of each traffic group. A check is made whether a minimum data packet delay for any traffic group exceeds a defined threshold value. A throttling rate is calculated for each traffic group in the split-architecture network, in response to the defined threshold value being exceeded.

A network element executes a controller in a split-architecture network. The controller is coupled to a plurality of switches implementing the data plane of the split-architecture network, wherein the controller monitors congestion of traffic groups across the split-architecture network and executes a method for providing delay based data rate control to alleviate congestion of the traffic groups across the split-architecture network, where each traffic group is a flow of data packets to be handled in a same manner, the data packets of each traffic group having a shared ingress switch and egress switch from the plurality of switches for the split-architecture network. The network element includes an ingress port configured to receive data traffic over the split-architecture network. The network element also includes an egress port configured to transmit data traffic over the split-architecture network. A network processor in the network element is communicatively coupled to the ingress port and the egress port, the network processor configured to execute a traffic delay monitoring module, a switch configuration module, and a throttling rate calculation module. The switch configuration module is configured to configure an ingress switch and an egress switch for each traffic group to collect delay measurement data for data packets of each traffic group as they arrive at the ingress switch and egress switch. The traffic delay monitoring module is configured to receive delay measurement data from the ingress switch and egress switch of each traffic group, and the throttling rate calculation module configured to check whether a minimum data packet delay for any traffic group exceeds a defined threshold value, and to calculate a throttling rate for each traffic group in the split-architecture network, in response to the defined threshold value being exceeded.

BRIEF DESCRIPTION OF THE DRAWINGS

The invention may best be understood by referring to the following description and accompanying drawings that are used to illustrate embodiments of the invention. In the drawings.

DETAILED DESCRIPTION

The following description describes methods and apparatus for managing traffic rates or load across a split-architecture network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

The techniques shown in the figures can be implemented using code and data stored and executed on one or more electronic devices. Such electronic devices store and communicate (internally and/or with other electronic devices over a network) code and data using non-transitory tangible computer-readable storage medium (e.g., magnetic disks; optical disks; read only memory; flash memory devices; phase-change memory) and transitory computer-readable communication medium (e.g., electrical, optical, acoustical or other forms of propagated signals-such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible computer-readable medium and transitory computer-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

Overview

The embodiments provide process and system for congestion control in split-architecture networks. The method and system can be implemented in any network with a centralized controller, such as generalized multi-protocol label switching (GMPLS) networks. The split-architecture network design introduces a separation between the control and forwarding components of the network. Among the example use cases of such architecture are the access/aggregation domain of carrier-grade networks, mobile backhaul networks, cloud computing systems, and multilayer (e.g., Internet Protocol (IP), Ethernet, optical transport network (OTN), and wavelength-division multiplexing (WDM)) support, all of which are among the main building blocks of network infrastructure. Therefore, proper design, management and performance optimization of these networks are of great importance.

The Transmission Control Protocol (TCP) has been widely used in the Internet for congestion control by adjusting transmission rates of the end-hosts according to packet drops in the network. TCP's end-to-end congestion control mechanism reacts to packet losses by reducing the number of outstanding unacknowledged data segments in the network. However, the TCP congestion control and similar congestion control techniques implemented in traditional networks are limited in performance and effectiveness. These performance issues are mainly because the implementations of congestion control mechanisms are performed using distributed processes. In other words, decisions are made on a per congested link basis, and not based on the network-wide congestion status. With a distributed congestion control mechanism, each node (i.e., network element) in the network decides on packet dropping (or marking) independently, which can result in non-optimal bandwidth sharing among the competing flows.

In one embodiment, the traffic rate control process and system implement packet throttling in a centralized manner. This process can be implemented in split-architecture networks with central controllers: the controller calculates the required throttling rate based on the information received on path delays. This throttling rate information is sent to the ingress switches to be applied to the incoming traffic thereby effecting a centralized congestion control that is based on end-to-end congestion information and conditions rather than local information and conditions.

The centralized traffic rate control process and system provides advantages over the existing congestion control mechanisms because the centralized traffic rate control process and system utilizes the existence of a central controller. The controller receives at least one-way delay information across all (desired) paths in networks. This provides a network-wide view of the congestion status in the network, based on which more intelligent, efficient and fair congestion control and traffic-admission decisions can be made. Also, this centralized monitoring enables packet throttling rates to, optionally, be based on priorities of different traffic groups—i.e., packets of traffic groups that have lower priorities will be dropped more frequently at network's ingress.

Delay-based rate control requires collecting statistics only from the border switches. It is, therefore, particularly advantageous over a utilization-based approach, because not all switches in the network may be capable of collecting rate statistics and sending these statistics to the controller. The process and system described herein below only require support of border switches and similar network elements at the edge of the networks governed by the controllers (i.e., at the edges of the domain). The embodiments thereby provide for traffic rate control and packet throttling in split-architecture networks that is based on delay measurements across the network (between border switches), and could be implemented in any network with central controllers.

The embodiments implement controlling the rate of each traffic group by measuring the delay experienced by that group across the network. If the delay exceeds some threshold, the path is identified as congested. After the controller calculates the appropriate throttling rate, it sends this information to the ingress switches, which can then start throttling packets of the congested traffic group accordingly.

The traffic rate controlling process and system operate over any network consisting of many switches, controlled by a logically centralized controller. The controller gathers traffic statistics from all the switches, and, based on this information, makes decisions on packet dropping rates. This decision is sent to appropriate ingress switches, where packets are (probabilistically) dropped at times of congestion.

In one embodiment, traffic in the split-architecture network is grouped into different traffic groups, each with an assigned weight. The assigned weights can be utilized such that they only come into effect when the network is congested. For example, the weighting can be applied when a particular path is congested. The controller then calculates the appropriate packet dropping rates of each traffic group sharing that path according to the traffic group's weight.

Traffic group prioritization can be managed through weight assignment and there is no constraint on how many levels of priority exist. In other words, adding more levels of priority does not add to the complexity of computations, signaling, or queuing (i.e., as there will be no separate queuing for different traffic groups within the network).

The traffic rate controlling process and system can be implemented for mobile backhaul/core networks, which are important use cases that could benefit from the quality of service implementation provided by the traffic rate controlling process and system. Rather than enforcing guaranteed quality of service for each individual user, operators can group users (or applications) into traffic groups, prioritize traffic groups, and treat each group's traffic according to the assigned priority level during times of congestion.

A traffic group as discussed above and further herein below is a set of packets that need to be treated equally by the congestion control mechanism. For instance, a traffic group can be defined as an application (identified by port number), an end-host (identified by source IP address), a web server (identified by destination IP address), an aggregated set of users (belonging to an ISP), traffic of a specific VLAN, traffic between a specific pair of ingress-egress nodes, and similar types of data traffic. All packets in a traffic group must have the same entry point (ingress switch) to the split-architecture network and the same exit point (egress switch) from the split-architecture network. Moreover, packets of a traffic group all need to traverse the same path (same set of switches and links) across the network.

Different traffic groups can be prioritized by assigning weights to them, for example, larger weights can be used to indicate that fewer packet drops at times of congestion. A weight can be any arbitrary positive number that will be assigned to a traffic group. In one embodiment, different traffic groups have different weights, while in other embodiments more than one traffic group can share a particular weight. Any granularity of the weights or on the number of possible different weights assigned in a split-architecture network can be supported by the traffic rate controlling process and system. In one embodiment, the assigned weights come into effect when the network is congested. When the split-architecture network is congested, the required packet dropping rate for each traffic group can be calculated based on the group's weight, as explained further herein below. In one embodiment, the relative weight of two traffic groups only matters if the two traffic groups traverse the same congested links in the split-architecture network. Otherwise, the two traffic groups may never compete for the same resources, for example bandwidth over a particular link. Thus, in this example, the weight assignment for each traffic group can be independent of the other traffic group.

In one example embodiment, a delay measurement mechanism measures the one-way delay across the split-architecture networks by the central controllers. The delay measurement mechanism is for measuring the delay experienced by 'actual' data packets of a particular traffic group, rather than injecting some data packets into the network and measuring the delay experienced by these packets. The delay measurement process functions by recording the arrival times of a number of packets of a traffic group at both the ingress and egress switches of the path traversed by the respective traffic group. If the timers on both the ingress and egress switches are synchronized, then the delay or traversal time between the ingress switch and egress switch for data packets of a particular traffic group could be calculated as the time difference between arrival time at the egress and ingress switches.

The challenge, however, is in recording arrival times of the 'same' set of packets at both ingress and egress switches. To address this issue, in one example embodiment, the following steps are taken, first arrival times of a sequence of packets (e.g., 200 data packets) belonging to the desired traffic group (i.e., a data flow) at both the ingress and egress switches of the path through the split-architecture network are recorded at the respective ingress and egress switches. Next, a hash function is applied to these selected data packets to encode the full packet into a fixed number of bits (at both the ingress and egress switches). The hash value is stored along with the time stamp in a time stamp table (TST) or similar data structure. The recorded time information is then sent to the central controller. At the controller, the timestamps of data packets with the same hash value are compared. The path delay is calculated as the difference between the two timestamps. Once the time stamp data is received, the controller can signal ingress and egress switches that the time stamp tables can be reset such that another set of time stamps for newly arrived data packets can be collected. This process as implemented by the controller is described further herein below in regard to FIG. 1. However, one skilled in the art would understand that other delay measurement mechanisms can be utilized and this example is provided by way of illustration and not limitation. Any delay measurement mechanism can be utilized to collect and correlate delay measurements that are examined to determine when to throttle data traffic at the ingress switches.

Figure 1:
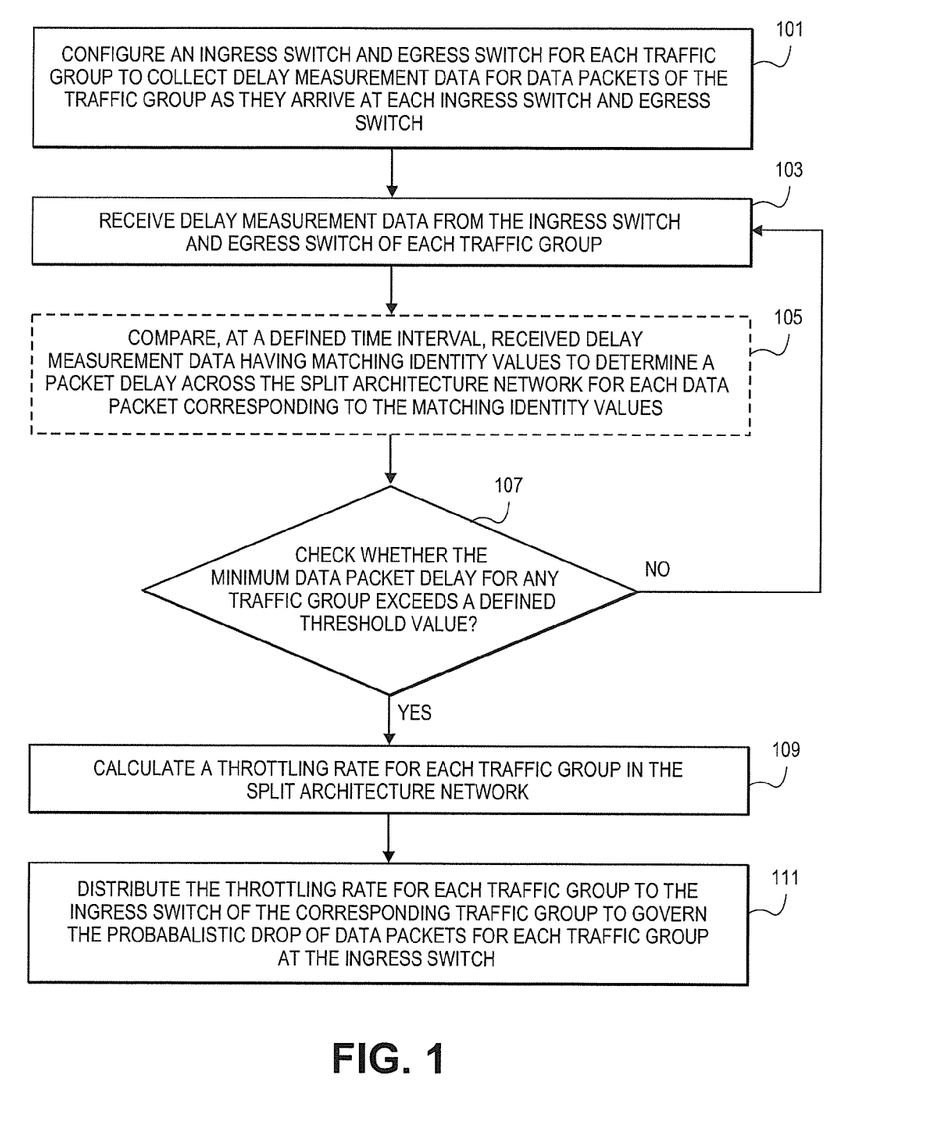
FIG. 1 is a flowchart of one embodiment of the process for traffic rate control.

FIG. 1 is a flowchart of one embodiment of the process for traffic rate control executed by the controller in a split architecture network. In one embodiment, the process is initiated at the time of controller start up. However, the process can also be initiated at any time during the operation of the controller. The process can be initiated as part of the start-up process, at the direction of and administrator or under similar circumstances. The process is provided by way of example and not limitation, one skilled in the art would understand that the principles and steps described herein can be differently arranged or structured to achieve traffic rate control in a split-architecture network. Similarly, the process is described as being implemented by a single controller, for a set of traffic groups and a set of paths across the split-architecture network tied to these traffic groups. This presentation is utilized for sake of clarity, one skilled in the art would understand that the controller function could be distributed and that any number of traffic groups (or similar data flow groupings), switches, paths and the like can also be supported by the process.

In one embodiment, the controller configures an ingress switch and egress switch for each traffic group to delay measurement data for data packets of the traffic group as they arrive at each ingress switch and egress switch (Block 101). This delay measurement data can be collected along with identity values for use in identifying corresponding data packets. As discussed above, each traffic group has a single ingress switch, a single egress switch, and a single path across the split-architecture network between the ingress switch and egress switch. Data packets traversing the split-architecture network can be associated with just one traffic group. In one example embodiment, an identity value for each delay measurement can be generated by any type of hashing function that can be employed by the ingress switch and egress switch to generate a hash value for each data packet that is received, such that the same hashing function is utilized at both the ingress switch and egress switch to generate the hash values for a given traffic group. An identity value assists the controller to ensure comparable delay measurement data is received at the controller to identify a traversal time or packet delay of a particular packet. The ingress switch and egress switch can be configured to record and report any number of data packet delay measurements (e.g., time stamps) to the controller. Each data packet delay measurement can be recorded and reported or a sampling can be recorded. Any sampling frequency or pattern can be employed. In one embodiment, the sampling pattern can be configured to match at the respective ingress and egress switches. In other embodiments, the sampling pattern and frequency are not exact matches or specifically aligned. In this case, there may be any number of unmatched delay measurements at the controller, which can be discarded while the matching delay measurements are utilized.

After configuration of the ingress and egress switches, the controller can start receiving delay measurement data (and optionally associated identity values) from the ingress switch and egress switch of each traffic group (Block 103). The identity values and delay measurement data can be provided in any format and with any meta data such that the controller can match the identity values from the ingress and egress switches with one another and with a particular traffic group. These identity values and delay measurements can be reported at any rate and any number or format of identity values and delay measurement data can be provided in these reports. In one embodiment, the messages or reports providing the identity values and time stamps can be provided at regular or scheduled intervals. In other embodiments, the identity values and delay measurement data are provided when the buffer, table or similar data structure of the ingress switch or egress switch is full or approaching capacity. In further embodiments, the controller can poll or similarly request the identity values and delay measurement data.

In some optional embodiments, a comparison is made, at defined time intervals, of the received delay measurement data and identity values to identify matching identity values that enable determination of a packet delay across the split-architecture network for each data packet corresponding to the matching identity values (Block 105). The packet delay can be calculated as the difference between the delay measurements (e.g., timestamps) where there is a matching identity value (e.g., a hash value). More precisely, the delay measurement from the egress switch can be subtracted or similarly compared to the delay measurement of the ingress switch to determine the packet delay for a particular data packet for a particular traffic group. The defined time intervals, similar to the reporting of the identity values and delay measurement data, can vary based on a schedule, resource utilization, data receipt or similar factors.

A check can then be made whether the minimum data packet delay for any traffic group exceeds (or falls below) a defined threshold (Block 107). For example, to determine if a path P is congested or not, the following metric can be utilized: the controller makes measurements periodically (with period T). At the beginning of each time interval T, the controller makes around of measurements on the delay of the path. This is done by sampling N packets at both end points of the path and finding the difference of their delay measurements (e.g., timestamps). If the minimum delay measured over one interval exceeds threshold D, then the path is declared as congested.

$$\text{Min(measured delay over path } P\text{)}>D$$

Parameters T, N, and D are all configurable parameters that can be appropriately set by the network administrator or operator. These parameters could each be defined differently for different paths in the networks. Setting each of these parameters influences the accuracy of the congestion detection scheme. One skilled in the art would understand that these parameters can be specified by the network administrator for the efficient operation of the specific split-architecture network using any system or process for selecting the parameters. For sake of clarity it is assumed that the right time intervals, number of data packet samples, and delay thresholds are picked or by the network administrator or a specific process is implemented to automatically select these parameters at the controller for each desired path and traffic group in the network.

Thus, the detection of any minimum packet delay can trigger a recalculation of the throttling rates. However, if no minimum packet delay exceeds the threshold difference, then the process continues and awaits the receipt of the next set of delay measurement data (Block 103) to continually re-check for an exceeded threshold until the process is ended by a network administrator or similar scheduled completion.

Where the threshold has been exceeded, the process calculates a throttling rate for each traffic group in the split-architecture network (Block 109). In one embodiment, the packet drop rate ($P_i$) of a traffic group i with weight $W_i$ will be calculated as a function $P_i=f(W_i)$. Any distribution or throttling function can be utilized for function f. One skilled in the art would understand that any known distribution or throttling function can be configured to be utilized with a set of weights defined for each traffic group to generate a set of throttling rates, with one throttling rate for each traffic group, each throttling rate value indicating a relative or absolute rate at which data packets can be probabilistically dropped by the responsible ingress switch. It is possible that a process can pick the same drop rate for all traffic groups regardless of their weights. However, to provide more priority to traffic groups with larger weights, the drop rate needs to be inversely proportional to $W_i$—i.e., a smaller $W_i$ should result in an equal or larger packet drop rate.

After the throttling rate decision is made by the controller, the calculated rate is sent to the corresponding ingress switches. The throttling rate for each traffic group is distributed to the ingress switch of the corresponding traffic group to govern the probabilistic drop of data packets for each traffic group at the ingress switch (Block 111). When an ingress switch receives this information, it starts (probabilistically) drops packets of each traffic group according to the group's throttling rate. The ingress switch can continue to utilize the throttling rate until a new throttling rate is received from the controller. In other embodiments, the throttling rate can be a temporary setting that is removed once congestion abates or similar configurations can be utilized.

In one embodiment, after receipt of identity values and delay measurement data are received or after threshold check is made, the controller signals to the ingress and egress switches that have provided the identity values and delay measurement data to reset or clear the data structures used to store the identity values and delay measurement data. This frees up resources for the continued collection of delay measurement data and identity values for the data packets that continue to arrive at each of the border switches.

Figure 2:
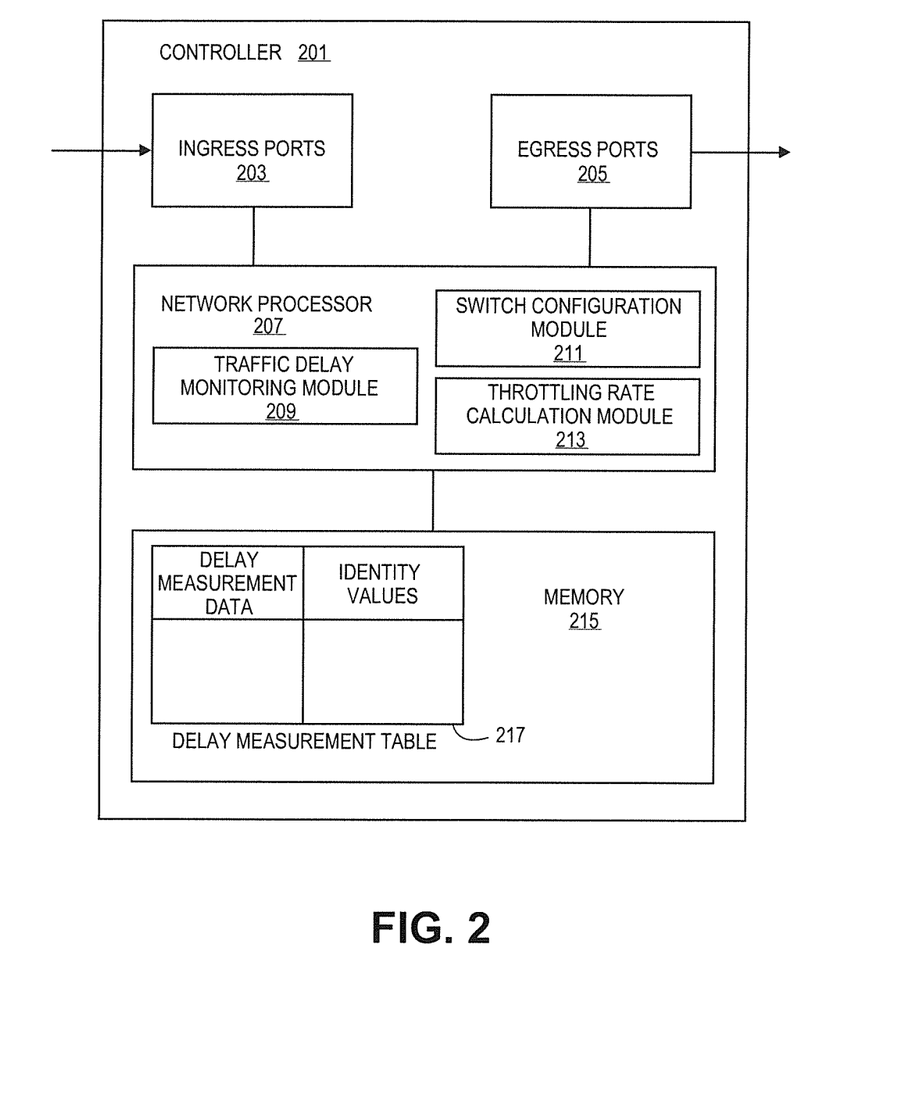
FIG. 2 is a diagram of one embodiment of components in a network element implementing traffic rate control.

FIG. 2 is a diagram of one embodiment of components in a network element implementing traffic rate control. In one embodiment, the controller 201 is implemented by a router or similar network element. In other embodiments, the network element implementing the controller 201 is a server or similar computing device. The controller 201 can be implemented as software on the network element executed by a general purpose process or specialized processor such as a network processor 207. The controller 201 can be stored in or utilize working memory 215 or similar storage space in the network element. The controller 201 can include many components and functions related to the administration and management of the switches in the split-architecture that are not illustrated. For sake of clarity, the components that implement the traffic rate controlling functions of the controller 201 are illustrated.

In one embodiment, the controller 201 includes or is in communication with a set of ingress ports 203 and egress ports 205. These ports enable the communication between the controller 201 and the switches under the control of the controller 201 in the split-architecture network. The ports 203, 205 can process incoming and outgoing communication at the L1/L2 and lower layers of communication with the other switches of the split-architecture network. The higher level process can then be performed by the network processor 207. The ingress ports 203 and egress ports 205 can receive the messages from the switches reporting identity values and delay measurement data as well as send configuration messages and similar communications for implementing the traffic rate control process.

The network processor 207 can implement the functionality described herein above through a set of components, including a traffic delay monitoring module 209, a switch configuration module 211, a throttling rate calculation module 213 and similar components. One skilled in the art would understand that the module are provided by way of example and that the functions could be implemented using any distribution and grouping of functionality within a controller 201 or distributed across multiple controllers.

In one embodiment, a traffic delay monitoring module 209 receives the identity values and/or delay measurement data from the connected switches and stores them in a delay measurement table 217 in the memory 215. Any number, size or configuration of delay measurement tables can be used such that the delay measurement data 219 and the identity value 221 data is maintained and the association with between these values is maintained along with the association with a particular traffic group or similar data flow grouping. The traffic delay monitoring module 209 can also compare, at a defined time interval, the received delay measurement data to find those having matching identity values. The traffic delay monitoring module 209 can further determine a data packet delay across the split-architecture network for each data packet corresponding to the matching identity values using the respective delay measurement data.

In one embodiment, the switch configuration module 211 is executed by the network processor to configure an ingress switch and an egress switch for each traffic group. The configuration includes configuring the ingress switch and egress switch to collect delay measurement data for data packets of each traffic group as they arrive at the ingress switch and egress switch along with identity values for corresponding data packets. The switch configuration module 211 can generate configuration messages that specify the delay measurement mechanism to utilize, the traffic group definitions, intervals for delay measurement reporting, and similar characteristics of the traffic rate control process as implemented at the ingress and egress switches. The switch configuration module 211 can also generate the messages to notify the ingress switches of the throttling rates to be utilized for each traffic group including starting throttling rates and re-calculated throttling rates as received from the throttling rate calculation module 213.

The throttling rate calculation module 213 is executed by the network processor 207 to check whether a minimum data packet delay for any traffic group exceeds a defined threshold value, and to calculate a throttling rate for each traffic group in the split-architecture network, in response to the defined threshold value being exceeded. The throttling rate calculation module 213 can implement any throttling function to distribute load across the split-architecture network. The throttling rate calculation module 213 can apply a set of weights to the function as configured by a network administrator or as similarly pre-defined for each traffic group. The resulting set of throttling rates can then be provided to the switch configuration module 211 to be distributed to the respective ingress switches.

The memory 215 can be any kind, number or variety of storage device(s) including dynamic random access memory, static memory, magnetic disk, or similar storage device. The memory 215 can store code for the modules executed by the network processor 207 as well as data structures such as the delay measurement table 217 that are needed to implement the throttling rate control process. Other information and data structures stored in the memory can include hashing functions, weighting data for traffic groups, traffic group data, and similar information.

Figure 3:
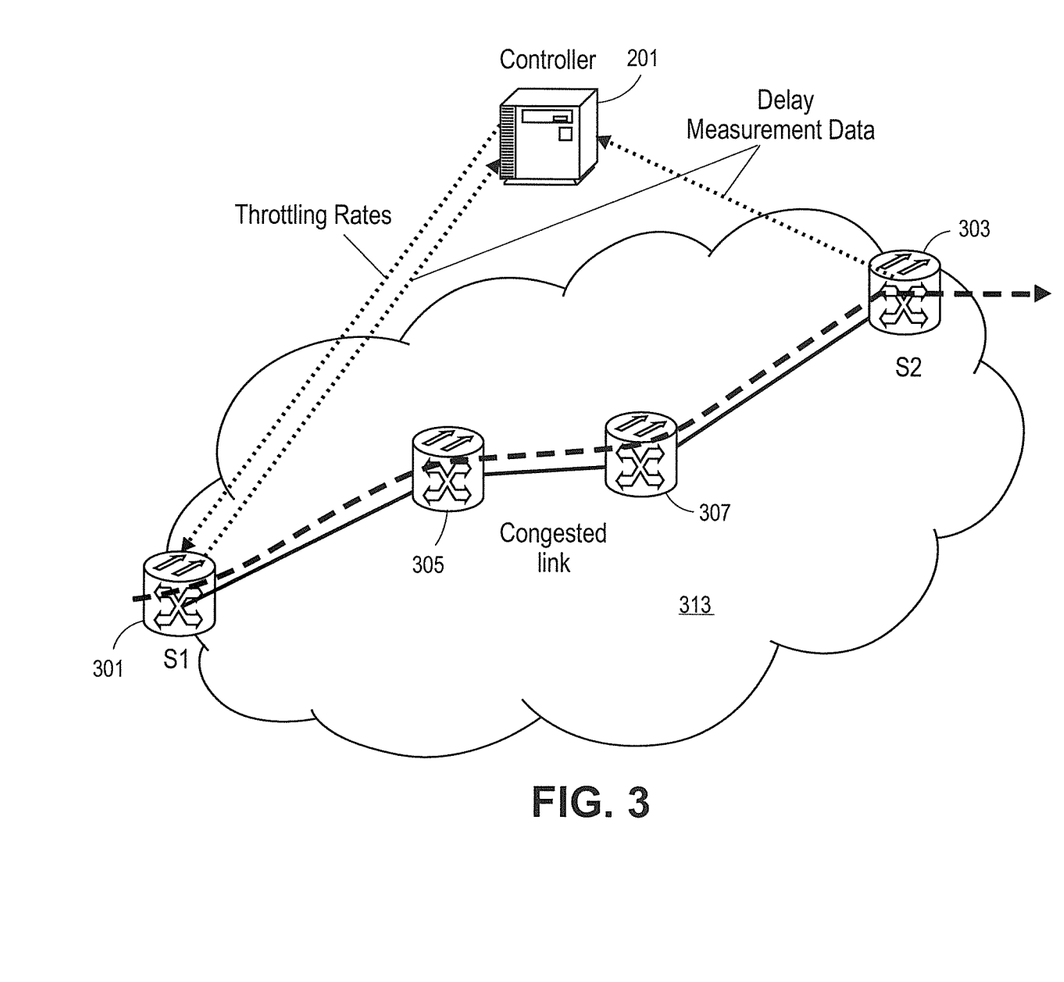
FIG. 3 is a diagram of one embodiment of a split-architecture network implementing traffic rate control.

FIG. 3 is a diagram of one embodiment of a split-architecture network implementing traffic rate control. In one embodiment, the split-architecture network 313 can include any number of switches and controllers that manage the flow of data traffic across the network 313. The example embodiment is illustrated to show a single path that would be associated with a particular traffic group. This is provided by way of example, the split-architecture network can include any number of switches and paths across the network.

In the example embodiment, the traffic group has an ingress switch 301 that traverses switches 305, 313 before reaching an egress switch 303 in the split-architecture network 313. Congestion could occur, for example, between the switches 305, 313, however, the throttling rate control process does not require either of these intermediate switches to participate in the process. Instead, the border switches, including ingress switch 301 and egress switch 303 report delay measurement data that enables the controller 201 to send throttling rates to the ingress router 301 that adjust the rate of data traffic across the congested link. Similar throttling rates are calculated for other traffic groups that may traverse the congested link to reduce the congestion and prioritize the traffic across the congested link while reducing overall traffic in the split-architecture 313 that would not be able to traverse the congested link.

Figure 4:
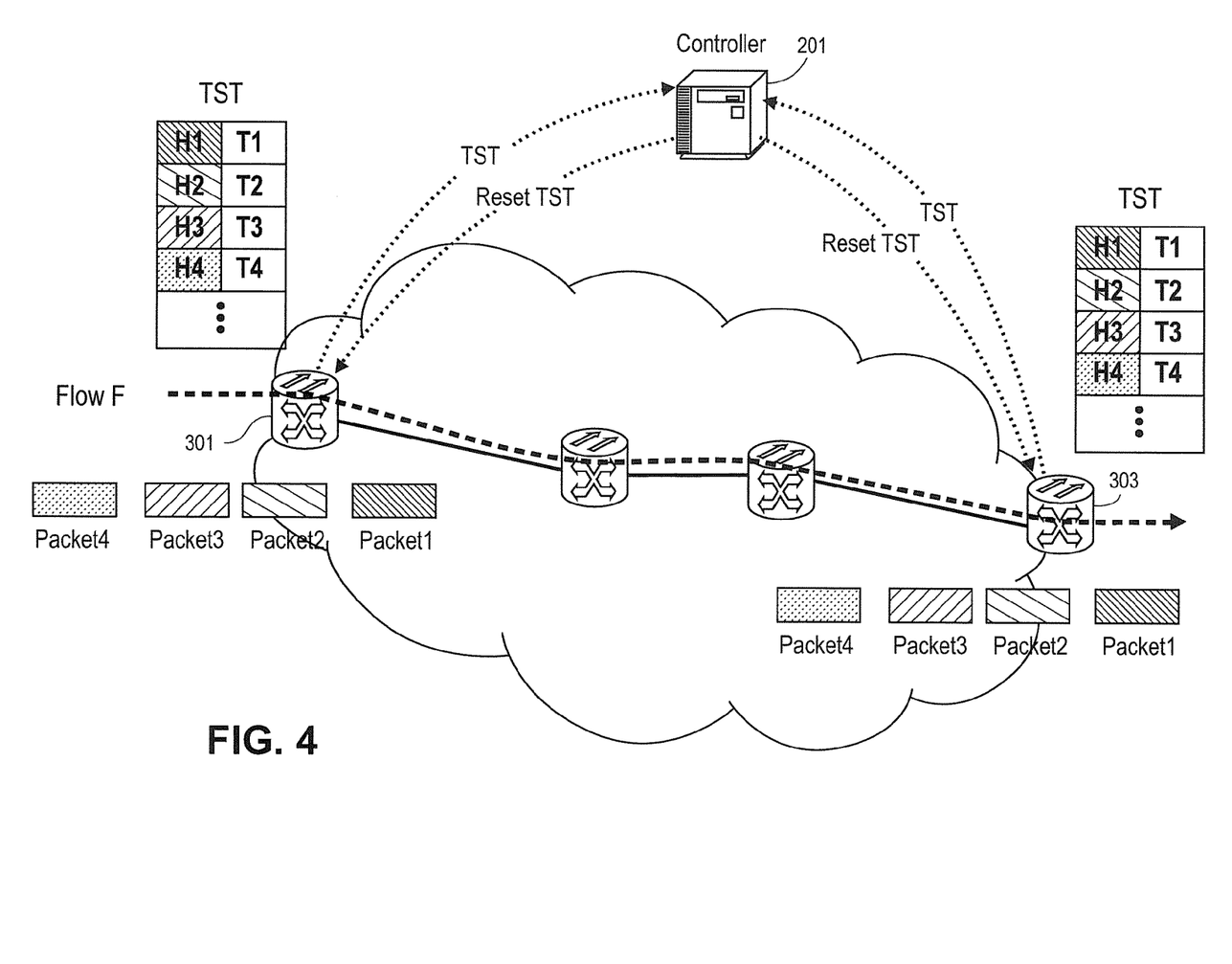
FIG. 4 is a diagram of another embodiment of a split-architecture network implementing traffic rate control.

FIG. 4 is a diagram of another embodiment of a split-architecture network implementing traffic rate control. This example embodiment, illustrates the collection and reporting of identity values in the form of hash values and delay measurement data in the form of time stamps at the ingress switch 301 and egress switch 303. One skilled in the art would understand that this is provided by way of example and not limitation. Any type of delay measurement mechanism can be utilized in conjunction with the throttling rate process. In this example, each switch 301, 303 maintains a time stamp table (TST). Each switch 301, 303 collects the data of the respective TST according to a configured sampling pattern or frequency.

In the example, each switch 301, 303 has received a set of four packets that are to be sampled (in this case they are identical, but this is not required). Each packet, as it is received at each switch 301, 303 has a time stamp T1-T4 added to the TST along with a hash value H1-H4 calculated over the header or any portion of the corresponding packet, such that each hash value is essentially unique. Each hash value and time stamp tuple is thus recorded in the local TST.

Each switch 301, 303 can supply their own TST to the controller 201 at defined intervals, when the TSTs become full, in response to a request from the controller 201 and/or under similar circumstances. Upon receipt or use of the received TST by the controller 201, the controller sends a 'reset TST' command to each switch 301, 303. The reset TST command directs the switches 301, 303 to clear out the entries of the TST that have been processed by the controller 201 to make room for additional entries in the ongoing traffic monitoring process to continue.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a controller in a split-architecture network, the controller coupled to a plurality of switches implementing the data plane of the split-architecture network, wherein the controller monitors congestion of traffic groups across the split-architecture network and executes the method for providing delay based data rate control to alleviate congestion of the traffic groups across the split-architecture network, where each traffic group is a flow of data packets to be handled in a same manner, the data packets of each traffic group having a shared ingress switch and egress switch from the plurality of switches for the split-architecture network, the method comprising the steps of:
configuring an ingress switch and egress switch for each traffic group to collect delay measurement data for data packets of each traffic group as they arrive at the ingress switch and egress switch;
receiving the delay measurement data from the ingress switch and egress switch of each traffic group;
checking whether a minimum data packet delay across the split-architecture network for any traffic group exceeds a defined threshold value; and
calculating a throttling rate for each traffic group in the split-architecture network, in response to the defined threshold value being exceeded.

2. The method of claim 1, further comprising the step of:
distributing the throttling rate for each traffic group to the ingress switch of the corresponding traffic group to govern a probabilistic drop of data packets for each traffic group at the ingress switch.

3. he method of claim 1, wherein configuring the ingress switch and egress switch further comprises the step of:
configuring the ingress switch and egress switch to generate an identity value using any portion of the data packets to generate the identity value to link corresponding delay measurement data for a data packet.

4. The method of claim 1, wherein configuring the ingress switch and egress switch further comprises the step of:
configuring the ingress switch and egress switch to provide delay measurement data and identity values to the controller periodically in a form of a table.

5. The method of claim 1, wherein the minimum data packet delay is calculated by taking a minimum data packet delay from a set of data packet delays for an associated traffic group, the set of data packet delays including data packet delays for delay measurement data received since a previous minimum data packet delay calculation.

6. The method of claim 1, further comprising:
signaling the ingress switch or the egress switch to send additional delay measurement data in response to processing the received delay measurement data.

7. The method of claim 1, further comprising:
comparing, at a defined time interval, received delay measurement data having matching identity values to determine a data packet delay across the split-architecture network for each data packet corresponding to the matching identity values.

8. A network element executing a controller in a split-architecture network, the controller coupled to a plurality of switches implementing the data plane of the split-architecture network, wherein the controller monitors congestion of traffic groups across the split-architecture network and executes a method for providing delay based data rate control to alleviate congestion of the traffic groups across the split-architecture network, where each traffic group is a flow of data packets to be handled in a same manner, the data packets of each traffic group having a shared ingress switch and egress switch from the plurality of switches for the split-architecture network, the network element comprising:
an ingress port configured to receive data traffic over the split-architecture network;
an egress port configured to transmit data traffic over the split-architecture network;

a network processor communicatively coupled to the ingress port and the egress port, the network processor configured to execute a traffic delay monitoring module, a switch configuration module, and a throttling rate calculation module, the switch configuration module configured to configure an ingress switch and an egress switch for each traffic group to collect delay measurement data for data packets of each traffic group as they arrive at the ingress switch and egress switch;

the traffic delay monitoring module configured to receive delay measurement data from the ingress switch and egress switch of each traffic group, and the throttling rate calculation module configured to check whether a minimum data packet delay across the split-architecture network for any traffic group exceeds a defined threshold value, and to calculate a throttling rate for each traffic group in the split-architecture network, in response to the defined threshold value being exceeded.

9. The network element of claim 8, wherein the throttling rate calculation module is further configured to distribute the throttling rate for each traffic group to the ingress switch of the corresponding traffic group to govern a probabilistic drop of data packets for each traffic group at the ingress switch.

10. The network element of claim 8, wherein the switch configuration module is further configured to configure the ingress switch and egress switch to generate an identity value over any portion of the data packets.

11. The network element of claim 8, wherein the switch configuration module is further configured to configure the ingress switch and egress switch to provide the delay measurement data to the controller periodically in a form of a table.

12. The network element of claim 8, wherein the throttling rate calculation module is further configured to calculate the minimum data packet delay by taking a minimum data packet delay from a set of data packet delays for an associated traffic group, the set of data packet delays including data packet delays from delay measurement data received since a previous minimum data packet delay calculation.

13. The network element of claim 12, wherein the traffic delay monitoring module is further configured to signal the ingress switch or the egress switch to send additional delay measurement data in response to processing the received delay measurement data.

14. The network element of claim 8, wherein the traffic delay monitoring module is configured to compare, at a defined time interval, received delay measurement data having matching identity values to determine a data packet delay across the split-architecture network for each data packet corresponding to the matching identity values.

* * * * *

UNITED STATES PATENT AND TRADEMARK OFFICE
CERTIFICATE OF CORRECTION

PATENT NO.       : 8,989,010 B2  
APPLICATION NO.  : 13/678396  
DATED            : March 24, 2015  
INVENTOR(S)      : Beheshti-Zavareh et al.

It is certified that error appears in the above-identified patent and that said Letters Patent is hereby corrected as shown below:

In the Specification

In Column 2, Line 59, delete "amore" and insert -- a more --, therefor.

In Column 3, Line 1, delete ""one embodiment."" and insert -- "one embodiment," --, therefor.

In Column 7, Line 65, delete "around" and insert -- a round --, therefor.

In the Claims

In Column 12, Line 25, in Claim 3, delete "he method" and insert -- The method --, therefor.

Signed and Sealed this  
Eighth Day of September, 2015

Michelle K. Lee  
*Director of the United States Patent and Trademark Office*